(12) United States Patent
Meli

(10) Patent No.: US 6,295,149 B1
(45) Date of Patent: Sep. 25, 2001

(54) SYSTEM AND METHOD OF TELECOMMUNICATION WITH WAVELENGTH DIVISION MULTIPLEXING COMPRISING A DEMULTIPLEXER

(75) Inventor: Fausto Meli, Piacenza (IT)

(73) Assignee: Pirelli Cavi e Sistemi S.p.A., Milan (IT)

( * ) Notice: Subject to any disclaimer, the term of this patent is extended or adjusted under 35 U.S.C. 154(b) by 0 days.

(21) Appl. No.: 09/006,400

(22) Filed: Jan. 13, 1998

Related U.S. Application Data

(60) Provisional application No. 60/044,549, filed on Apr. 28, 1997.

(30) Foreign Application Priority Data

Jan. 15, 1997 (IT) .............................................. MI97A0054

(51) Int. Cl.[7] .................................................... H04J 14/02
(52) U.S. Cl. ......................... 359/130; 359/124; 359/133; 359/110; 359/173; 359/127; 385/24; 385/37
(58) Field of Search ..................................... 359/124, 130, 359/110, 133, 173, 127; 385/24, 37

(56) References Cited

U.S. PATENT DOCUMENTS

| | | | |
|---|---|---|---|
| 4,244,045 | * | 1/1981 | Nosu et al. ............................. 370/3 |
| 4,441,181 | | 4/1984 | Winzer et al. . |
| 5,267,073 | | 11/1993 | Tamburello et al. . |

(List continued on next page.)

FOREIGN PATENT DOCUMENTS

| | | |
|---|---|---|
| 0 677 902 A1 | 10/1995 | (EP) . |
| 0 713 110 A1 | 5/1996 | (EP) . |
| 57-23906 | 2/1982 | (JP) . |
| WO 96/19743 | 6/1996 | (WO) . |

OTHER PUBLICATIONS

K. Tetsuo et al., "Transmission Type Optical Filter, Multi–Wavelength Demultiplexing Filter and Ring Laser", (JP 07 336327) Patent Abstracts of Japan, vol. 096, No. 004, (1996).

Y. Takashi et al., "Optical Signal Switching Device", (JP 08 172395) Patent Abstracts of Japan, vol. 096, No. 011, (1996).

K. Yoichi et al., "Optical Demultiplexing and Multiplexing Device", (JP 08 184730) Patent Abstracts of Japan, vol. 096, No. 011, (1996).

O. DeLange, "Wide–Band Optical Communication Systems: Part II—Frequency–Division Multiplexing", Proceedings of the IEEE, 58(10) :1683–1690 (1970).

(List continued on next page.)

Primary Examiner—Leslie Pascal
Assistant Examiner—Hanh Phan
(74) Attorney, Agent, or Firm—Finnegan, Henderson, Farabow, Garrett & Dunner, L.L.P.

(57) ABSTRACT

Method of optical telecommunication comprising the phases of generating at least two optical transmission signals, at mutually different preset wavelengths separated by a preset distance; multiplexing the said optical signals by wavelength division in a single transmission fiber, forming a multi-wavelength optical signal comprising the said optical transmission signals; transmitting the said multi-wavelength optical signal through the said optical fiber to a receiving station comprising at least two receivers; selecting at least one of the said optical transmission signals from the said multi-wavelength optical signal; feeding the said filtered optical signal to the respective receiver; characterized in that before the said phase of selecting at least one of the said optical transmission signals it further comprises the phases of eliminating from the said multi-wavelength optical signal, at least one signal with wavelength different from the wavelength of the said at least one selected optical transmission signal.

23 Claims, 4 Drawing Sheets

U.S. PATENT DOCUMENTS

| | | |
|---|---|---|
| 5,457,760 | 10/1995 | Mizrahi . |
| 5,504,609 | 4/1996 | Alexander et al. . |
| 5,608,825 * | 3/1997 | Ip ............................................ 385/24 |
| 5,696,615 * | 12/1997 | Alexander ............................ 359/134 |
| 5,737,104 * | 4/1998 | Lee et al. .............................. 359/124 |
| 5,748,350 * | 5/1998 | Pan et al. .............................. 359/130 |
| 5,793,508 * | 8/1998 | Meli ...................................... 359/130 |
| 5,841,918 * | 11/1998 | Li ........................................... 385/24 |

OTHER PUBLICATIONS

A. Ali et al., "Services Integration and Multiplexing for Broad–Band Communication Systems", IEEE Journal on Selected Areas in Communication, sac–4(4): 551–562 (1986).

* cited by examiner

SYSTEM AND METHOD OF TELECOMMUNICATION WITH WAVELENGTH DIVISION MULTIPLEXING COMPRISING A DEMULTIPLEXER

This application claims benefit of provision application Ser. No. 60/044,549 filed Apr. 28, 1997.

BACKGROUND OF THE INVENTION

The subject of the present invention are a system and a method of optical telecommunication, which is particularly adapted for transmission with wavelength division multiplexing, or WDM, in which the various signals are recognized and separated on reception.

In transmission by wavelength division multiplexing, or WDM, it is required to send several mutually independent transmission signals down the same line, consisting of optical fibers, using optical wavelength domain multiplexing; the signals transmitted can be either digital or analog and are distinguished from one another since each possesses a specific wavelength separate from that of the other signals.

The carrying out of such WDM transmission makes provision for allocating specific wavelength bands of preset width, hereinafter termed channels, to each of the signals with different wavelength.

Such signals, distinguished hereinafter by a wavelength value, the said central wavelength of the signal, have some spectral width about the central wavelength value, which depends, in particular, on the characteristics of the laser source for the signal and on the modulation imparted thereto in order to associate information with the signal. Typical values of spectral width of the signal emitted by a laser, in the absence of modulation, are about 10 Mhz; in the presence of external modulation, for example at 2.5 Gbit/s, it has a spectral width of around 5 GHz.

For the purpose of transmitting signals in a large number of channels, making use of the so-called third transmission window of silica fibers and of the useful band of optical amplifiers (typically from 1535 to 1561 nm), the wavelength separation between these signals beneficially is of the order of nanometers.

For correct reception of such transmission signals, it is therefore necessary to effect a separation between these signals, in order to forward them to the respective users.

Narrow-band optical filters can be used for this purpose, through which only the signal in the selected channel can pass, thereby guaranteeing the absence of unwanted signals, which would constitute noise if super-imposed on the selected signal. The use of such filters, however, requires both high wavelength-stability of the signal transmitted, and high intrinsic stability of the central wavelength of these filters. Furthermore, in the case in which the number of channels is large, the passband of the filters has to be sufficiently narrow.

Filters having narrow passband and high isolation between one channel and another are difficult to obtain commercially, in particular on account of problems of industrial reproducibility.

Patent Application EP 0 629 885 proposes to use, in each selective channel filter, two Bragg reflection filters placed in series. The passband is obtained by suitably positioning the two reflection peaks of the filters.

Patent U.S. 5,504,609 describes a demultiplexer for selecting a particular channel from the multiplexed signal and delivering it to the receiver. To carry out channel selection, the multiplexed signal is sent to an optical filter via a coupler. The wavelength of the channel is reflected by the optical filter to the receiver via the coupler. The optical filter comprises a Bragg-grating element which reflects the wavelength of the channel and transmits all the others.

Patent Application EP 0 713 110 describes the use of a filter consisting of a fiber which incorporates a Bragg-grating normally reflecting filter and of two inclined Bragg filter gratings. This fiber is connected to a port of an optical circulator.

The Patent abstract of Japan, vol. 096, No. 011, 29 November 1996, JP 08 184730 A, discloses a device that is provided with optical filters which have transmission wavelength bands corresponding to the respective wavelengths of light signals constituting a wavelength multiplex light signal and transmit only the light signals in the transmission wavelength bands while reflecting others and plural mirrors which are provided corresponding to mutually adjacent optical filters and remove light signals belonging to transmission wavelength band of one optical filter from the light signal reflected by the filter and reflects other light signals to the other optical filter. For demultiplexing, when part of a light signal which should be transmitted originally through each optical filter is reflected by the optical filter, the light signal is adsorbed by a mirror to prevent interference.

The article of O. E. Delange, with the title "Wide band optical communication systems: Part II—Frequency-Division multiplexing", proceedings of the IEEE, Oct. 1970, vol. 58, no. 10, discloses that the composite multicarrier incoming signal is applied to the first analyzer, which is followed by a quarter-wave plate and a filter tuned to pass the first channel carrier and its sidebands. Ideally all remaining applied frequencies are reflected back to the analyzer, which passes them out of its sidearm and onto a mirror that reflects them to the second analyzer where the process is repeated.

The Patent abstract of Japan, vol. 096, no. 011, 29 November 1996, JP 08 172395 A, discloses a wavelength separating device where plural fiber grating filters different by reflection wavelength and optical circulator are cascaded.

The Patent U.S. 5,457,760, discloses that in the demultiplexer, branching waveguides are positioned between the input waveguide and N output waveguides. These branching waveguides have optical filtering elements, such as Bragg gratings, formed therein. Each output optical waveguides having an optical filter comprising an array of optical filtering elements, such as Bragg diffraction gratings, formed in a contiguous portion of the output waveguide.

SUMMARY OF THE INVENTION

The Applicant observes that in all the prior art systems above the demultiplexing system does not reduce the selectivity requirement of the final filters used for channel separation.

According to the present invention the problem is settled of rendering the separation less critical by filtering the various signals in a wavelength division multiplexing transmission system.

It is found in particular that, by eliminating the signals from the adjacent channels, the subsequent selection by filtering of the signal relating to the channel desired on reception is less critical. Further-more, according to the present invention, it is found that the requirements of isolation between the channels can be shared by two filters. It is found that it is possible to use filters which are simpler to construct and hence more readily available. It is further found that it is possible to use optical sources with a central wavelength of emission with wider tolerances than the known art.

In its first aspect, the present invention relates to a method of optical telecommunication comprising the phases of:

generating at least first, second and third optical transmission signals, at preset wavelengths having predetermined wavelength spacings to each other;

multiplexing the said optical signals by wavelength division in a single transmission fiber, forming a multi-wavelength optical signal comprising the said optical transmission signals;

transmitting the said multi-wavelength optical signal through the said optical fiber to a receiving station comprising at least one receiver;

selecting one of the said optical transmission signals from the said multi-wavelength optical signal;

feeding the said filtered optical signal to the respective receiver; characterized in that said phase of selecting one of the said optical transmission signals it comprises the phases of:

eliminating from said multi-wavelength optical signal an optical signal having wavelength intermediate of the wavelengths of two of said optical transmission signals;

transmitting one of said two optical transmission signals through a first optical filter having a predetermined bandwidth, wider than said spacing between said signals;

reflecting the other of said optical signals of said multi-wavelength optical signal;

transmitting said other optical signal through a second optical filter.

In particular, in the said method of optical telecommunication, before the said phase of selecting one of the said optical transmission signals, the said multi-wavelength optical signal is subdivided over at least two output fibers.

In particular, the said phase of selecting is repeated until all the optical signal of said multi-wavelength optical signal are selected.

In its second aspect, the present invention relates to a system of optical telecommunication, comprising:

a transmitting station comprising means of generating transmission signals at least two preset wavelengths, and means of wavelength division multiplexing of the said transmission signals, in a single fiber optic line;

a station for receiving the said transmission signals, comprising means of selective separation of the said transmission signals;

a fiber optic line linking the said transmitting and receiving stations, characterized in that the said means of selective separation of the said transmission signals comprise at least one Bragg grating filter and at least one interference filter operatively associated in succession, wherein said Bragg grating filter eliminates from the said transmission signals at least one transmission signal.

In particular, said Bragg grating filter eliminates from the said transmission signals at least one transmission signal with wavelength different from the wavelength of a transmission signal selected by the said interference filter.

In particular, said Bragg grating filter has a reflected wavelength band, and the said interference filter has a transmitted wavelength band. Preferably the reflected band of the said Bragg grating filter comprises at least one of the said preset wavelengths and that the transmitted band of the said interference filter comprises at least one other of the said preset wavelengths. In particular, said at least one Bragg grating filter and the said at least one interference filter are connected in series.

In particular, said at least one Bragg grating filter is connected to a port of a circulator and the said at least one interference filter is connected to another port of the said circulator.

Preferably said interference filter further possesses a reflected band comprising at least one other of the said preset wavelengths.

In a preferred embodiment said Bragg filter grating has a −0.5 dB reflected band of greater than or equal to 0.3 nm.

In a preferred embodiment said Bragg filter grating has a −20 dB reflected band of less than or equal to 1.2 nm.

In a preferred embodiment said interference filter has a −0.5 dB passband of greater than or equal to 0.5 nm.

In a preferred embodiment said interference filter has a −25 dB passband of less than or equal to 2.4 nm. In particular, in the presence of the said at least two preset wavelengths at a distance of up to 1.6 nm apart, the said at least one Bragg grating filter and the said at least one interference filter are selected in such a way as to obtain in combination an isolation between the said at least two wavelengths of at least 35 dB. In particular, in the presence of the said at least two preset wavelengths at a distance of up to 0.8 nm apart, the said at least one Bragg grating filter and the said at least one interference filter are selected in such a way as to obtain in combination an isolation between the said at least two wavelengths of at least 25 dB.

Preferably said receiving station further comprises a signal divider able to distribute the said transmission signal as input over at least two output fibers.

In its last aspect, the present invention relates to a wavelength-selective optical receiving unit comprising means of selective separation of wavelength division multiplexed transmission signals, characterized in that said means of selective separation of the said transmission signals comprise at least one Bragg grating filter and at least one interference filter operatively associated in succession, wherein said Bragg grating filter eliminates from the said transmission signals at least one transmission signal.

Preferably said Bragg grating has a reflected band which comprises at least one of the said preset wavelengths and in that the said interference filter has transmitted band which comprises at least one other of the said preset wavelengths.

Preferably said at least one Bragg grating filter and the said at least one interference filter are connected in series.

Preferably said Bragg grating filter has a reflected band which comprises at least one of the said preset wavelengths and in that the said interference filter has transmitted band which comprises the said at least one of the said preset wavelengths.

Preferably said at least one Bragg grating filter is connected to a port of a circulator and the said at least one interference filter is connected to another port of a circulator.

Preferably said interference filter possesses a reflected band comprising at least one other of the said preset wavelengths.

Preferably said Bragg grating filter eliminates from the said transmission signals at least one transmission signal with wavelength different from the wavelength of said transmission signal selected by the said interference filter.

Preferably said Bragg grating filter eliminates from the said transmission signals at least one transmission signal with wavelength equal to the wavelength of said transmission signal selected by the said interference filter.

Further details may be gleaned from the following description, with reference to the appended drawings in which are shown:

DETAILED DESCRIPTION OF THE INVENTION

Figure 1:
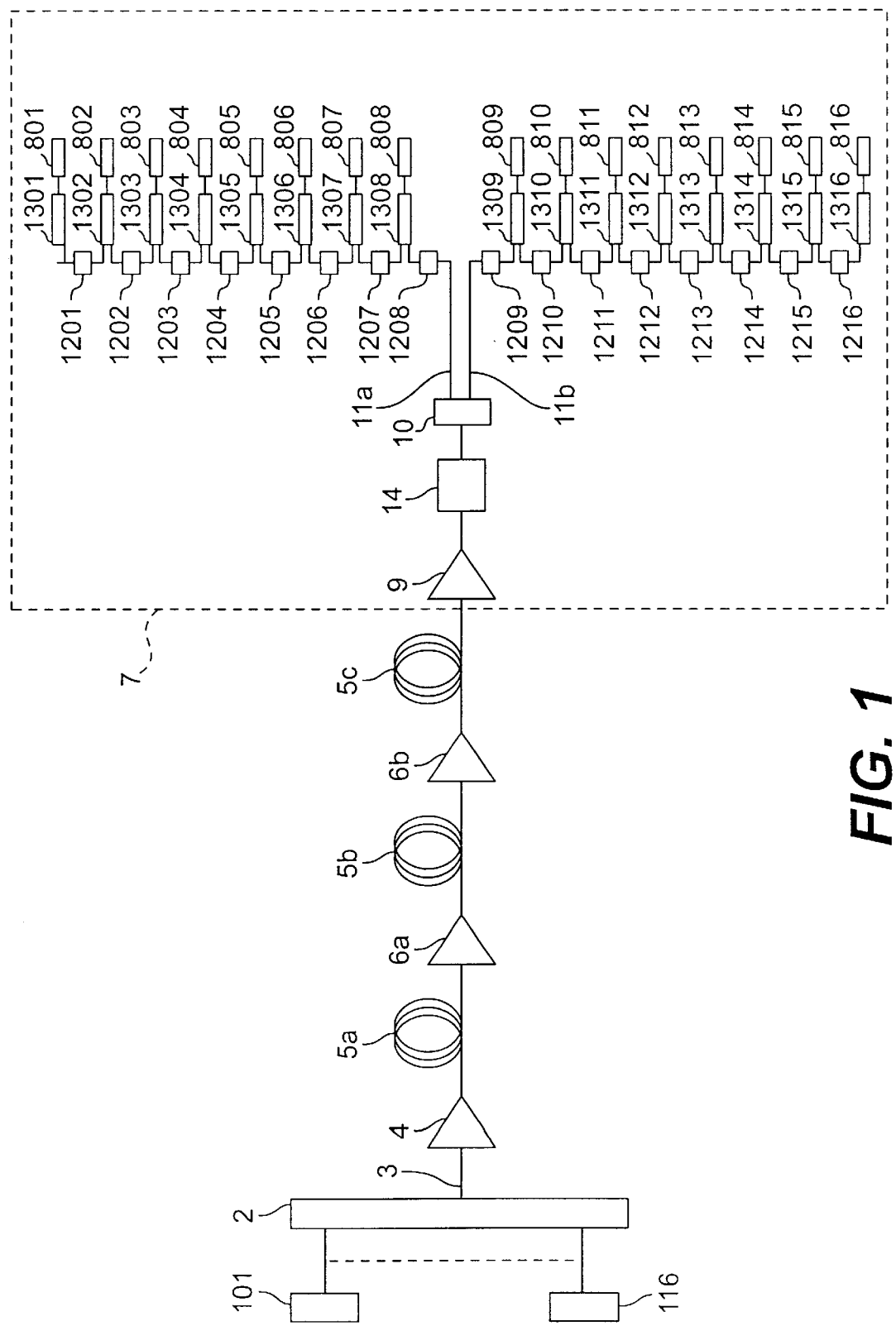
In FIG. 1 a diagram of a multi-wavelength telecommunication system according to the present invention.

As shown in FIG. 1, a multichannel optical telecommunication system, with wavelength division multiplexing, according to the present invention provides several optical signal sources, sixteen in the example of FIG. 1, respectively indicated with the references 101 to 116, having wavelengths designated by values increasing successively from $\lambda 1$ to $\lambda 16$, included within the useful working band of the amplifiers arranged in the system. For example, in the case in which the amplifiers are of the type with erbium-doped active fiber, with a useful working band typically ranging from 1535 to 1561 nm, the wavelengths may take the values $\lambda 1=1535.04$ nm, $\lambda 2=1536.61$ nm, $\lambda 3=1539.77$ nm, $\lambda 4=1541.35$ nm, $\lambda 5=1542.94$ nm, and so on up to $\lambda 16=1560.61$ nm with a spacing of around 1.6 nm between the various wavelengths.

In the presence of particular requirements or of systems with a different number of channels or with a different useful working band, it will be possible to have channels with differently selected wavelengths.

For the purposes of the present invention, unless specified otherwise, the phrase emission wavelength of a laser source is understood to mean a wavelength band, of preset width, centered about a central wavelength of emission.

The said central wavelength is, in general, prechosen within a constructional tolerance, on the basis of which commercial lasers are selected. Selection is beneficially supplemented with fine and stable checking of the temperature of the laser.

The optical signals can be generated directly at the desired wavelengths, or can be emitted, on the basis of signals at different wavelengths, for example originating from an external system, with the use of adapter devices able to receive the optical signals, detect them and reemit them at the desired wavelengths, via direct modulation or the external modulation of respective laser sources using the detected signals.

Adapter devices of the above type are described, in particular, in the patent U.S. 5,267,073, and are marketed by the Applicant under the designation TXT-DM or TXT-EM.

The said optical signals are fed to a signal combiner 2, or multiplexer, able simultaneously to send the signals at the wavelengths $\lambda 1$ to $\lambda 16$ through a single output optical fiber 3.

In general, the signal combiner 2 is a passive optical device, through which the optical signals transmitted over respective optical fibers are superimposed in a single fiber; devices of this kind consist for example of FUSED-fiber couplers, made from planar optics, microoptics and the like.

By way of example, a suitable combiner is that marketed under the label SMTC2D00PH210 by E-TEK DYNAMICS INC., 1885 Lundy Ave, San Jose, Calif. (USA).

The said optical signals are sent through the fiber 3 to a power amplifier 4 which raises their power to a value sufficient to cover a subsequent span of optical fiber stretching to a further means of amplification, whilst maintaining the required transmissive quality.

For the purposes of the present invention and for the abovementioned use, the power amplifier 4 is, for example, a fiber optic amplifier of commercial type, having an input power of from −13.5 to −3.5 dBm and an output power of at least 13 dBm.

A suitable model is, for example, TPA/E-MW, marketed by the Applicant, making use of erbium-doped active optical fiber.

The phrase power amplifier is understood to mean an amplifier able to amplify a signal of high power, for example as described in detail in European Patent EP 439,867 in the name of the Applicant.

To the amplifier 4 is therefore linked a first span 5a of optical line, usually consisting of a monomode optical fiber, of the stepped-index type, inserted into a suitable optical cable, some tens (or hundreds) of kilometers in length; for example, with the means of amplification described hereinafter and the power levels indicated, around 100 kilometers.

In some cases it is also possible to use optical fibers of the dispersion-shifted type.

Present at the end of said first span 5a of optical line is a first line amplifier 6a, able to receive the signals, attenuated during their in-fiber journey, and to amplify them to a level sufficient to feed them to several successive spans of optical line 5b, 5c with similar characteristics to the previous one, and to corresponding line amplifiers 6b (only two optical-fiber spans 5b and a single amplifier gb are indicated in the figure, in order to simplify the graphical representation) covering the required total transmission distance and arriving at a receiving station 7, in which the signals are distributed, as regards the various signals transmitted, identified by the respective wavelengths, and sent to the respective receivers, indicated with references 801 to 816 in the figure.

The line amplifiers 6a and 6b can be of the erbium-doped active fiber type, single-stage or multi-stage, as described in detail, for example, in European Patent Application EP 677902 from the same Applicant, which is incorporated for reference.

Such amplifiers are marketed by the Applicant under the designation OLA/E-MW, with an overall output optical power of at least 13 dBm and a noise figure of around 5 dB.

The receiving station 7 comprises a preamplifier 9, able to receive the signals and amplify them, while compensating for the losses in the final span of optical line and the losses in the subsequent demultiplexing equipment, to a power level appropriate to the sensitivity of the receiving devices. For example, in the case of transmission at 2.5 Gbit/s, the power which has to reach the receiver has to be between −26 and −11 dBm; meanwhile it should introduce the minimum possible noise and maintain the equalization of the signals.

The preamplifier 9 is, for example, a commercial-type erbium-doped active optical-fiber optical amplifier, having a total input power of from −20 to −9 dBm and an output power of 0–6 dBm.

A suitable model is, for example, RPA/E-MW, marketed by the Applicant.

Signals are sent from the preamplifier 9 to a device able to distribute over several output fibers the optical signals fed to an input fiber; such a device, also termed a demultiplexer, consists, in the example described, of a FUSED-fiber divider 10, which subdivides the input signal over two output fibers, with the references 11a and 11b.

For example, for the divider 10, with two outputs, may be used that marketed by E-TEK DYNAMICS INC., 1885 Lundy Ave, San Jose, Calif. (USA) under the label SWBC2150AS21.

Between the preamplifier 9 and the divider 10 is preferably interposed an optical isolator 14. The optical isolator 14 is preferably an optical isolator of the type which is independent of the polarization of the transmission signal, with isolation of greater than 35 dB and reflectivity of less than −50 dB.

Suitable isolators are, for example, the model MDL I-15 PIPT-A S/N 1016 from the company ISOWAVE, 64 Harding Avenue, Dover, N.J., USA.

Such an isolator might not be needed should the preamplifier 9 employ, at its output, a similar isolator.

The fibers 11a, 11b are each linked to an alternating series of blocking filters, indicated with the references 1201 to 1216 in the figure, and of transmissive filters, indicated with the references 1301 to 1316 in the figure.

The phrase blocking filters is here intended to mean filters able to eliminate, in particular preferably by reflecting it, a wavelength or a selected wavelength band, while allowing through the remaining part of the optical signal; the phrase transmissive filters is intended to mean filters able to allow through a wavelength or a selected wavelength band, while reflecting or otherwise eliminating the remaining part of the optical signal.

The receivers 801–816 are linked to an outgoing fiber, respectively, by the filters 1301–1316.

Considering now the optical signal on the output 11a, this reaches a first blocking filter 1208 and then a first transmissive filter 1308, the output of which is connected to the respective receiver 808. That part of the optical signal reflected by the transmissive filter 1308 is sent to a second blocking filter 1207 and then to the transmissive filter 1307, the output of which is connected to the respective receiver 807. This structure is repeated in a similar manner ending up with the connection of the output of the transmissive filter 1301 to the respective receiver 801.

Considering now the optical signal on the output 11b, this reaches a blocking filter 1209 and then a transmissive filter 1309, the output of which is connected to the respective receiver 809. The optical signal reflected by the transmissive filter 1309 is sent to another blocking filter 1210 and then to the transmissive filter 1310, the output of which is connected to the respective receiver 810. This structure is repeated in similar manner ending up with the connection of the output of the transmissive filter 1316 to the respective receiver 816.

According to a preferred embodiment, the blocking filters connected to the fiber 11b, indicated with the references 1209 to 1216, reflect or otherwise eliminate the wavelengths with even indices, and the filters indicated with the references 1309 to 1316 transmit the wavelengths with odd indices, supplying the receivers referenced 809 to 816 with the wavelengths with odd indices from $\lambda 1$ to $\lambda 15$. The blocking filters connected to the fiber 11a, indicated with the references 1201 to 1208, reflect the wavelengths with odd indices, and the transmissive filters indicated with the references 1301 to 1308 transmit the wavelengths with even indices, supplying the receivers referenced 801 to 808 with the wavelengths with even indices from $\lambda 2$ to $\lambda 16$.

The blocking filters 1201–1216 are, preferably, equal in number to the number of signals transmitted and each eliminate a wavelength corresponding to one of the said signals, i.e. they are used as stop-band.

The transmissive filters 1301–1316 are also, preferably, equal in number to the number of signals transmitted and each transmit a wavelength corresponding to one of the said signals, and reflect the other signals.

For use as blocking filters 1201–1216 in the present invention it is possible to employ, in a preferred embodiment, Bragg-grating distributed reflecting optical waveguide filters which reflect the radiation in a narrow wavelength band and transmit the radiation outside this band.

The said filters consist of a portion of an optical waveguide, for example an optical fiber guide, along which the refractive index exhibits a periodic variation, and partial signal reflection occurs at the location of the said index variation: if the signal portions reflected at the location of each change of index are in phase with one another then constructive interference occurs and the incident signal is reflected.

The condition of constructive interference, corresponding to the maximum reflection, is expressed by the relation $2.1=\lambda_s/n$, where 1 indicates the interval of the grating formed by the variations in refractive index, $\lambda_s$ the wavelength of the incident radiation and n the refractive index of the core of the optical waveguide. The phenomenon described is referred to in the literature as distributed Bragg reflection.

The periodic variation in refractive index can be obtained with known techniques, for example by exposing a portion of optical fiber, divested of its protective polymeric sheath, to the interference fringes formed by an intense UV beam made to interfere with itself by means of an appropriate interferometric system, for example by means of a phase mask made of silicon.

The fiber, and in particular the core of the fiber, are thus exposed to UV radiation of an intensity which varies periodically along the optical axis. Partial breakage of the Ge-O bonds occurs in those parts of the core reached by the UV radiation of maximum intensity, thereby causing a permanent modification of the refractive index.

By choosing the interval of the grating in such a way as to satisfy the relation for constructive interference it is possible to determine at will the central wavelength of the reflected band, according to known criteria.

Filters of this type suitable for the present invention have to have a reflected wavelength band at −0.5 dB of greater than 0.3 nm and at −20 dB of less than 1.2 nm, reflectivity at the center of the band of up to 99%, the central wavelength of the reflected band determinable in the production phase within around ±0.1 nm and variations in the central wavelength of the band with temperature not exceeding 0.02 nm/° C.

Figure 2:
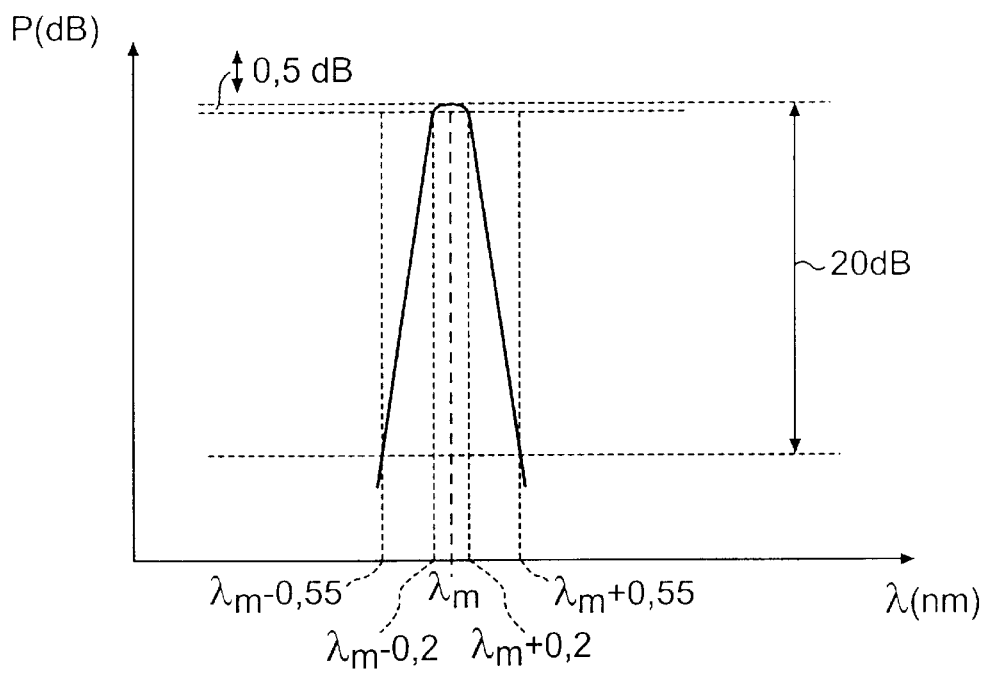
In FIG. 2 the graph of the reflection spectrum of a Bragg filter grating.

Shown in FIG. 2 is the graph of a reflection spectrum of a Bragg filter grating suitable for use within the scope of the present invention, where the reflected wavelength band at −0.5 dB is 0.4 nm and at −20 dB is 1.1 rm.

Such filters can for example be those marketed by 3M, 206 West Newberry Road, Bloomfield, Conn. (U.S.) under the family designation BFG.

The transmissive filters 1301–1316 suitable for use in the present invention are, preferably, multilayer bandpass interference filters. These preferably have three access optical fibers (input or output ports) and in the central part contain a selective reflecting component which behaves as bandpass in transmission and as band-elimination in reflection, i.e. which is able to transmit with low attenuation (for example with attenuation of less than 1.5 dB) the signals with wavelengths within a preset band and to reflect (with attenuation of the same order of magnitude) the signals with wavelengths outside this band. A signal input to the fiber of the filter with wavelength $\lambda p$ within the passband of the component, for example, is transmitted to a first output fiber. A signal input to the fiber with wavelength $\lambda r$ outside this band, on the other hand, is reflected to a second output fiber.

In what follows the band of wavelengths neighboring a wavelength of minimum attenuation in transmission and corresponding, in transmission through the filter, to an attenuation of not more than 0.5 dB in excess of the minimum attenuation, will be referred to as the 0.5 dB passband of the filter.

Similarly, the band of wavelengths neighboring a wavelength of minimum attenuation in reflection and corresponding, in reflection by the filter, to an attenuation of not more than 0.5 dB in excess of the minimum attenuation, will be referred to as the 0.5 dB reflected band of the filter.

The filters are chosen in such a way that for each of them the wavelength of one of the communication channels lies within the respective 0.5 dB passband, while the wavelengths of the remaining communication channels are included within the respective 0.5 dB reflected band.

Furthermore, the wavelength band corresponding, in transmission through the filter, to an attenuation of not more than 25 dB in excess of the minimum attenuation, will be referred to as the −25 dB passband of the filter, or more succinctly the −25 dB band.

Although described with three access fibers, the interference filters suitable for the use indicated above may have four access fibers, the fourth remaining unused.

An interference filter of the type referred to and suitable for the present invention has a −0.5 dB passband width of greater than or equal to 0.5 nm and a −25 dB bandwidth of less than or equal to 2.4 nm.

Figure 3:
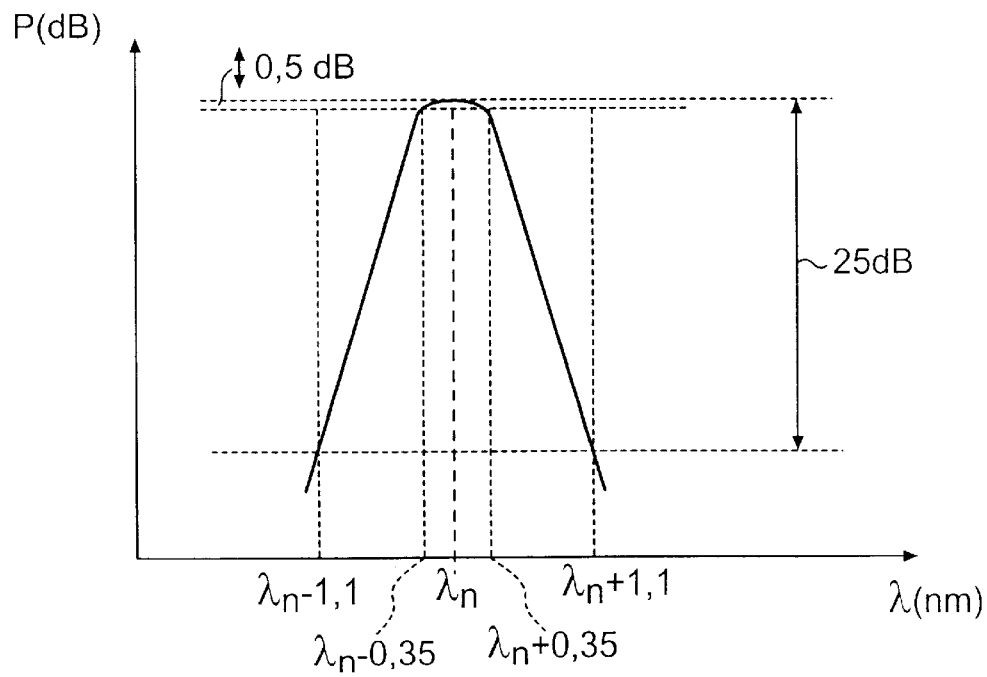
In FIG. 3 the graph of the transmission spectrum of an interference filter.

Shown in FIG. 3 is the graph of a transmission spectrum of an interference filter suitable for use within the scope of the present invention, where the −0.5 dB passband is 0.7 nm and the −25 dB bandwidth is 2.2 nm.

Interference filters of the type referred to and which are suitable for use in the present invention are marketed, for example, by the already mentioned E-TEK DYNAMICS INC., under the family designation DWDM.

Through the combined use of the filters described above it becomes possible to obtain interchannel isolation of around 35 dB, unobtainable with the use of a single filter. In fact, using a single interference filter of the type described, an isolation of 25 dB would be obtained.

The Applicant has observed furthermore that it is possible to use filters of a different type from those described, the characteristics of which are such as to accomplish the function indicated, as regards the transmission system in which they are employed.

In particular, for example, further interference filters may be used as blocking filters instead of the Bragg filter gratings, by selecting the passband of these filters so that it is such as, both in terms of width and spectral location, to allow through the signal relating to the channel to be selected in the succeeding transmissive filter, and block the signal relating to a channel adjacent to that to be selected.

Figure 4:
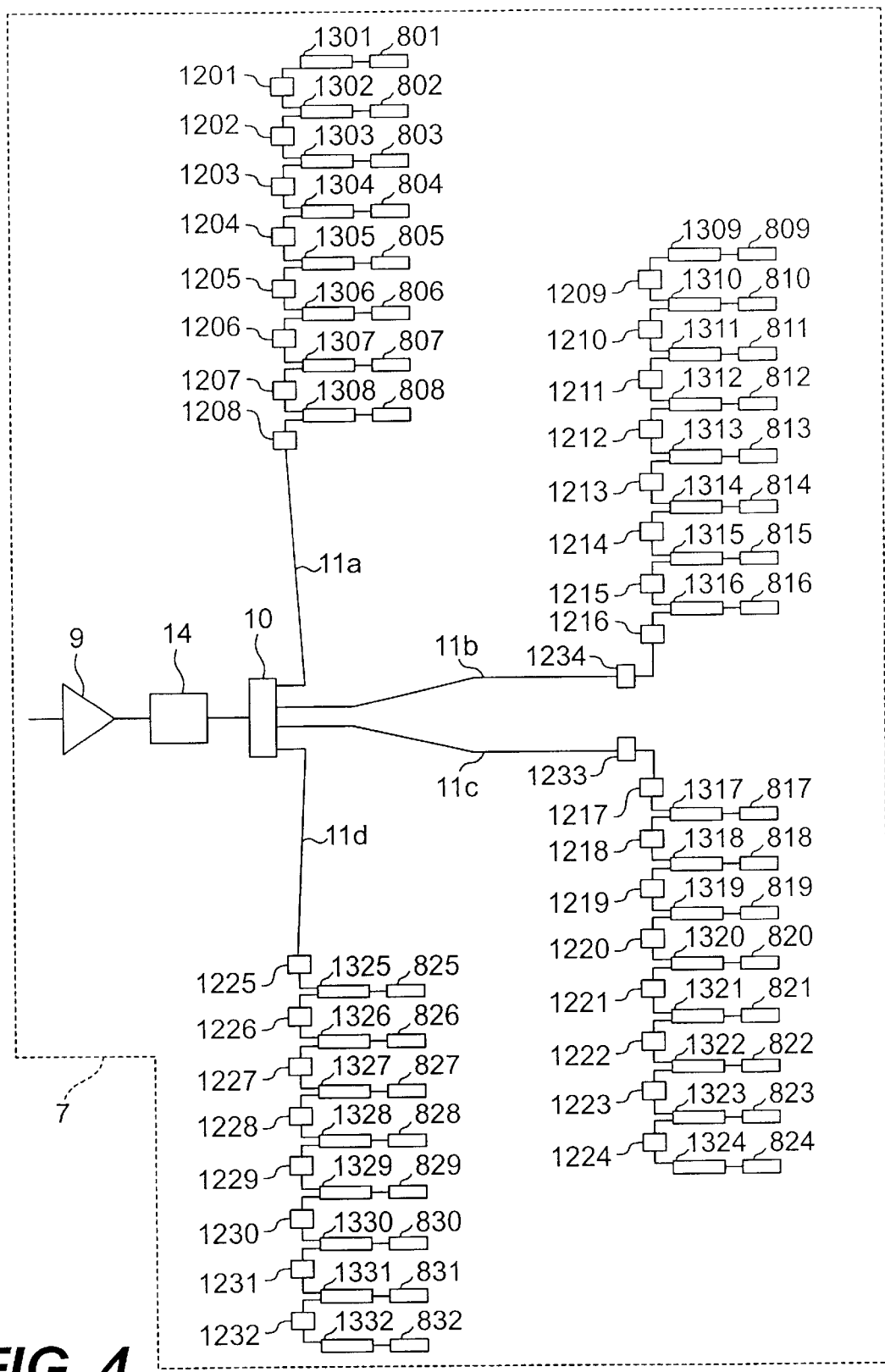
In FIG. 4 a diagram of a receiving station with 32 wavelengths according to a second embodiment of the present invention.

FIG. 4 shows a diagram of a receiving station 7 of a multichannel optical telecommunication system, with wavelength division multiplexing, according to a second embodiment of the present invention, which provides, in particular, 32 optical signal sources, not shown in the figure, having wavelengths designated by successively increasing values, from $\lambda 1$ to $\lambda 32$, lying within the useful working band of the amplifiers arranged in the system.

The receiving station 7 comprises, as in the example of FIG. 1, a preamplifier 9 able to receive the signals and to amplify them, by compensating for the loss given by the succeeding demultiplexing equipment, to a power level appropriate to the sensitivity of the receiving devices.

The signals are sent from the preamplifier 9 to a device able to distribute over several output fibers the optical signals fed to an input fiber; such a device, also termed a demultiplexer, consists, in the example described, of a FUSED-fiber divider 10, which subdivides the input signal into signals over several output fibers, four in the example illustrated, each of which is fed to respective fibers 11a, 11b, 11c, 11d.

For example, for the divider 10, with four outputs, may be used that marketed by the already mentioned E-TEK DYNAMICS INC., under the label SMTC2500AH21, or it is possible to use three dividers with two outputs, of the aforementioned type, linking two of them to the outputs of a third.

Between the preamplifier 9 and the divider 10 is preferably interposed an optical isolator 14. The optical isolator 14 is preferably an optical isolator of the type which is independent of the polarization of the transmission signal, with isolation of greater than 35 dB and reflectivity of less than −50 dB.

Suitable isolators are, for example, the model MDL I-15 PIPT-A S/N 1016 from the company ISOWAVE, 64 Harding Avenue, Dover, N.J., USA.

Such an isolator might not be needed should the preamplifier 9 employ, at its output, a similar isolator.

As regards the connections relating to the fibers 11a and 11d, in particular, the optical signal on the output 11a reaches a blocking filter 1208 and then a transmissive filter 1308, the output of which is connected to the respective receiver 808. The optical signal reflected by the transmissive filter 1308 is sent to another blocking filter 1207 and then to the transmissive filter 1307, the output of which is connected to the respective receiver 807. This structure is repeated in a similar manner ending up with the connection of the output of the transmissive filter 1301 to the respective receiver 801.

The optical signal on the output lid reaches a blocking filter 1225 and then a transmissive filter 1325, the output of which is connected to the respective receiver 825. The optical signal reflected by the transmissive filter 1325 is sent to another blocking filter 1226 and then to the transmissive filter 1326, the output of which is connected to the respective receiver 826. This structure is repeated in a similar manner ending up with the connection of the output of the transmissive filter 1332 to the respective receiver 832.

On the other hand, the optical signal on the output 11b feeds the cascaded blocking filters 1216 and 1234 and then reaches a transmissive filter 1316, the output of which is connected to the respective receiver 816. At this point the connections are similar to those already described earlier.

These are repeated in similar manner ending up with the connection of the output of the transmissive filter 1309 to the respective receiver 809.

Thus also the optical signal on the output 11c feeds the cascaded blocking filters 1217 and 1233 and then reaches a transmissive filter 1317, the output of which is connected to the respective receiver 817. At this point the connections are similar to those already described earlier. These are repeated in similar manner ending up with the connection of the output of the transmissive filter 1324 to the respective receiver 824.

Using the filters represented in FIGS. 2 and 3 an interchannel isolation of around 25 dB is obtained, unobtainable with the use of a single filter. In fact, using a single interference filter, an isolation of 15 dB would be obtained.

Figure 5:
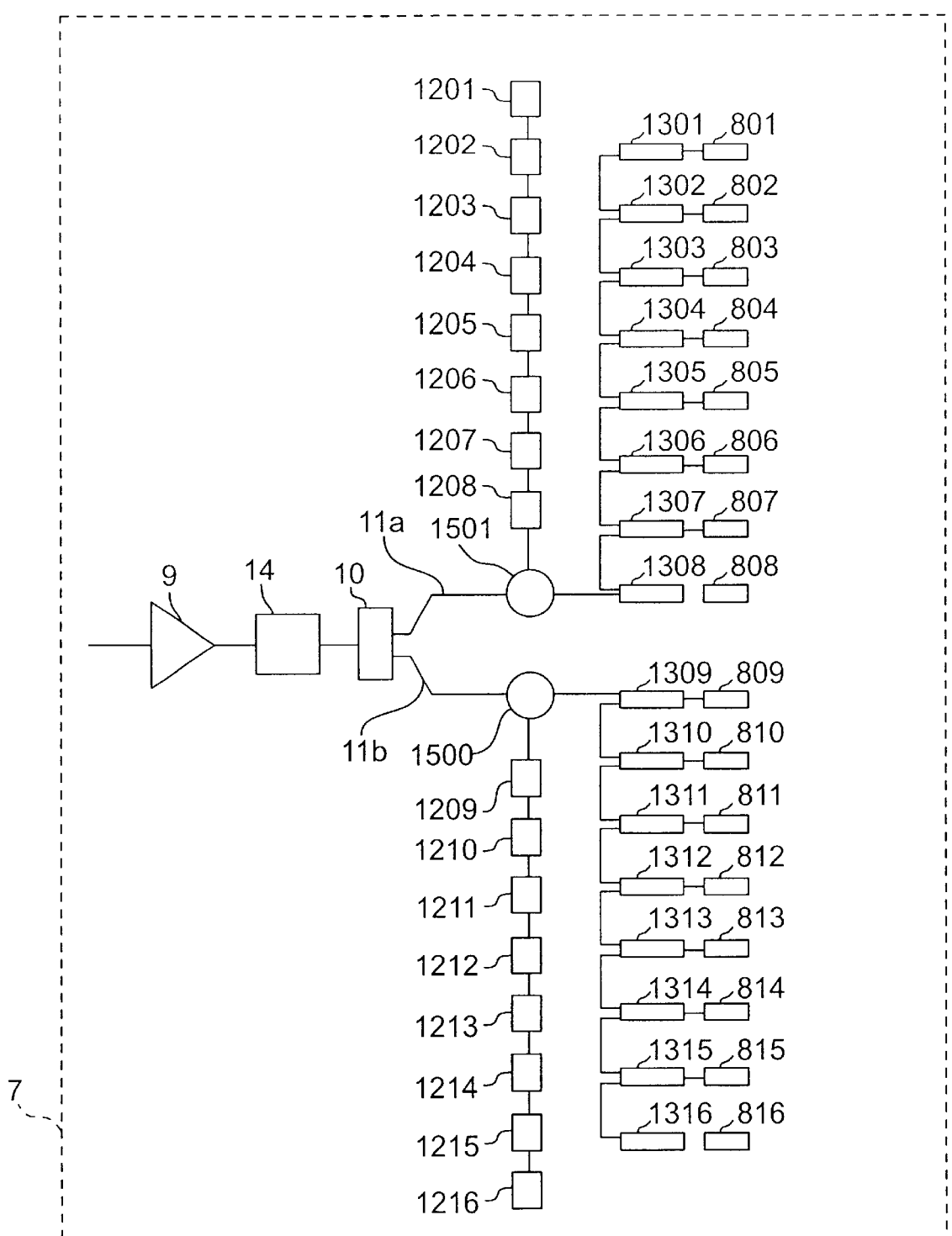
In FIG. 5 a diagram of a receiving station with 16 wavelengths according to a third embodiment of the present invention.

FIG. 5 shows a diagram of a receiving station 7 of a multichannel optical telecommunication system, with wavelength division multiplexing, according to a third embodiment of the present invention, which shows in the example illustrated, 16 optical signal sources.

The receiving station 7 comprises, as in the example of FIG. 1, a preamplifier 9 able to receive the signals and to amplify them, by compensating for the loss given by the succeeding demultiplexing equipment, to a power level appropriate to the sensitivity of the receiving devices.

The signals are sent from the preamplifier 9 to a device able to distribute over several output fibers the optical signals fed to an input fiber; such a device, also termed a demultiplexer, consists, in the example described, of a FUSED-fiber divider 10, which subdivides the input signal into signals over several output fibers, two in the example illustrated, each of which is fed to respective fibers 11a and 11b.

For example, for the divider 10, with two outputs, may be used that marketed by the already mentioned E-TEK DYNAMICS INC., under the label SWBC2150AS21.

Between the preamplifier 9 and the divider 10 is preferably interposed an optical isolator 14. The optical isolator 14 is preferably an optical isolator of the type which is independent of the polarization of the transmission signal, with isolation of greater than 35 dB and reflectivity of less than −50 dB.

Suitable isolators are, for example, the model MDL I-15 PIPT-A S/N 1016 from the company ISOWAVE, 64 Harding Avenue, Dover, N.J., USA.

Such an isolator might not be needed should the preamplifier 9 employ, at its output, a similar isolator.

The fiber 11a is linked to a first port of a circulator 1501. A series of blocking filters designated with the references 1201 to 1208 are linked to a second port of the circulator 1501.

Connected to a third port of the circulator 1501 is a series of transmissive filters with the references 1301 to 1308 linked to the respective receivers with the references 801 to 808. In particular, the transmissive filter 1308, whose output is connected to the respective receiver 808, is connected to the third port of the circulator 1501.

The optical signal reflected by the transmissive filter 1308 is sent to the transmissive filter 1307, the output of which is connected to the respective receiver 807. This structure is repeated in similar manner ending up with the connection at the output of the transmissive filter 1301 to the respective receiver 801.

Linked to the fiber 11b is a structure symmetric to the structure linked to the fiber 11a. In particular this is linked to a first port of a circulator 1500. A series of blocking filters designated with the references 1209 to 1216 are linked to a second port of the circulator 1500.

Connected to a third port of the circulator 1500 is a series of transmissive filters with the references 1309 to 1316 linked to the respective receivers with the references 809 to 816. In particular, the transmissive filter 1309, whose output is connected to the respective receiver 809, is connected to the third port of the circulator 1500.

The optical signal reflected by the transmissive filter 1309 is sent to the transmissive filter 1310, the output of which is connected to the respective receiver 810. This structure is repeated in similar manner ending up with the connection at the output of the transmissive filter 1316 to the respective receiver 816.

Using the filters represented in FIGS. 2 and 3, interchannel isolation of around 45 dB is obtained, unobtainable with the use of a single filter. In fact, using a single interference filter, an isolation of 25 dB would be obtained.

The foregoing having been a predominantly structural description, the operation of the system according to the present invention is as follows.

In particular, according to the example represented in FIG. 1, the signal leaving the optical fiber 11b reaches the blocking filter 1209 which reflects the signals having wavelength in a band centered about $\lambda 2$ and transmits the signals outside this band, i.e. those containing the wavelengths $\lambda 1$ and those from $\lambda 3$ to $\lambda 16$, to the transmissive filter 1309. The transmissive filter 1309 transmits the signals having wavelength in a band centered about $\lambda 1$ to the receiver 809 and reflects the signals having wavelength outside this band, i.e. those containing the wavelengths from $\lambda 3$ to $\lambda 16$, to the blocking filter 1210. This signal reaches the blocking filter 1210 which reflects the signals having wavelength in a band centered about $\lambda 4$ and transmits the signals outside this band to the transmissive filter 1310. The transmissive filter 1310 transmits the signals having wavelength in a band centered about $\lambda 3$ to the receiver 810 and reflects the signals having wavelength outside this band, i.e. those containing the wavelengths from $\lambda 5$ to $\lambda 16$, to the blocking filter 1211.

It should be noted that the wavelengths with odd indices are received by proceeding in this way. Reception of the wavelengths having even indices are receivable with the similar structure connected to the optical fiber 11a.

In particular the signal leaving the optical fiber 11a reaches the blocking filter 1208 which reflects the signals having wavelength in a band centered about $\lambda 15$ and transmits the signals outside this band, i.e. those containing the wavelengths $\lambda 16$ and those from $\lambda 14$ to $\lambda 1$, to the transmissive filter 1308. The transmissive filter 1308 transmits the signals having wavelength in a band centered about $\lambda 16$ to the receiver 808 and reflects the signals having wavelength outside this band, i.e. those containing the wavelengths from $\lambda 14$ to $\lambda 1$, to the blocking filter 1208. This signal reaches the blocking filter 1208 which reflects the signals having wavelength in a band centered about $\lambda 13$ and transmits the signals outside this band to the transmissive filter 1308. The transmissive filter 1308 transmits the signals having wavelength in a band centered about $\lambda 14$ to the receiver 808 and reflects the signals having wavelength outside this band, i.e. those containing the wavelengths from $\lambda 12$ to $\lambda 1$, to the blocking filter 1206. We proceed in this way until $\lambda 2$ reaches the receiver 801.

Referring now to FIG. 4 there is seen a structure similar to that of FIG. 1 in respect of the branches connected to the fibers 11a and 11d. In particular, according to the example represented in FIG. 4, the branch connected to the fiber 11a receives the odd channels with the wavelengths from λ15 to λ1 respectively with the receivers 801 to 808.

The branch connected to the fiber lid receives the even channels with the wavelengths from λ32 to λ18 respectively with the receivers 825 to 832.

The branches connected to the fibers 11b and 11c each have a blocking filter in addition to the structure already seen. Since they are dedicated to the filtering of the channels furthest inside the overall transmission band, it is necessary to eliminate an additional adjacent channel. In particular the blocking filters 1234 and 1216, connected to the fiber 11b, reflect the channels with the wavelengths λ15 and λ17, and the even channels with the wavelengths from λ2 to λ16 are received respectively with the receivers 809 to 816. The blocking filters 1233 and 1217, connected to the fiber 11c, reflect the channels with the wavelengths λ16 and λ18, and the odd channels with the wavelengths from λ17 to λ31 are received respectively with the receivers 817 to 824.

With reference to FIG. 5, the signal which reaches the first port of the circulator 1501 via the fiber 11a is transferred to the second port which is linked to the series of blocking filters 1201–1208. These blocking filters 1201–1208 are determined in such a way as to reflect the signals having wavelengths, for example, with even indices, i.e. λ2, λ4, λ6, λ8 . . . λ16. These signals are then transferred via the third port of the circulator 1501 to the subsequent transmissive filters 1301–1308.

These transmissive filters 1301–1308 are determined in such a way as to transmit to the respective receivers 801–808 the signals having wavelengths with even indices, i.e. λ2, λ4, λ6, λ8 . . . λ16.

On the other hand, the signal which reaches the first port of the circulator 1500 via the fiber 11b is transferred to the second port which is linked to the series of blocking filters 1209–1216. These blocking filters 1209–1216 are determined in such a way as to reflect the signals having wavelengths, for example, with odd indices, i.e. λ1, λ3, λ5, λ7 . . . λ15. These signals are then transferred via the third port of the circulator 1500 to the subsequent transmissive filters 1309–1316. These transmissive filters 1309–1316 are determined in such a way as to transmit to the respective receivers 809–816 the signals having wavelengths with odd indices, i.e. λ1, λ3, λ5, λ7 . . . λ15.

In this case, with respect to the structures represented in FIGS. 1 and 4, the blocking filters reflect the wavelengths which then have to be filtered by the respective transmissive filters. If we now consider, for example, the following as typical values of attenuation of the various optical elements:

| | |
|---|---|
| Bragg filters 12xx in reflection | ≈ 0 dB |
| Bragg filters 12xx in transmission | ≈ 0.3 dB |
| Interference filters 13xx in reflection | ≈ 0.7 dB |
| Interference filters 13xx in transmission | ≈ 1.6 dB |
| Divider 10 (with two outputs) | ≈ 3.5 dB |
| Circulator | ≈ 0.6 dB |

With the above values attenuations are obtained, between the various wavelengths, which, referring to FIG. 1, vary between a minimum of ≈ 5.4 dB, for the wavelengths λ1 and λ16 and hence for the signals input to the respective receivers 809 and 808, and a maximum of ≈ 12.4 dB, for the wavelengths λ2 and λ15 and hence for the signals input to the respective receivers 801 and 816. In the case of a transmission system having 32 channels as represented in FIG. 4 with a divider 10 (with four outputs) has an attenuation of ≈7.4 dB, we obtain attenuations between the various wavelengths which vary between a minimum of ≈9.3 dB for the wavelengths λ1 and λ32 and hence for the signals input to the respective receivers 808 and 825, and a maximum of ≈ 16.6 dB, for the wavelengths λ2 and λ31 and hence for the signals input to the respective receivers 809 and 824.

A divider 10 with 2 outputs has been used in FIG. 1 and in FIG. 5, and a divider 10 with 4 outputs in FIG. 4. The Applicant has noted also that such dividers can have a different number of outputs from that depicted in the examples. Varying the number of outputs, while keeping the structure of the connections of the filters similar, the number of filters used and the attenuation values for the various channels will vary. For example it is possible to form, instead of groups of 8 receivers connected to the same output fiber of the divider 10, groups of 4 receivers. In the case of 16 channels, with a structure (of the type depicted in FIG. 4) with 4 groups each with 4 receivers, there will be a minimum attenuation of ≈ 9.3 dB and a maximum attenuation of ≈ 12.3 dB.

In the case of 32 channels, with a structure with 8 groups each with 4 receivers and with a divider with 8 outputs having an attenuation of ≈ 10.5 dB, there will be a minimum attenuation of ≈ 12.4 dB and a maximum attenuation of ≈ 15.4 dB. It may be noted that in these cases, the variations in attenuation between the channels are more restricted than in the previous cases.

In the case of a transmission system as represented in FIG. 5 we have attenuations between the various wavelengths which vary between a minimum of ≈5.7 dB for the path between the blocking filter 1208 and the receiver 808 and a maximum of ≈ 14.8 dB for the path between the blocking filter 1201 and the receiver 801. With respect to the arrangement of the filters and of the receivers it is possible also to have attenuations of ≈ 9.9 dB for the path between the blocking filter 1201 and the receiver 808, and an attenuation of 10.6 dB for the path between the blocking filter 1208 and the receiver 801.

The number of independent wavelengths adopted for the signals for each transmission station is not limited to the value of 16 or 32 as described, and may take a different value. The number of wavelengths, corresponding to the number of optical channels which can be used for transmission, may be chosen as a function of the characteristics of the telecommunication system. The wavelengths may be chosen in such a way that the corresponding frequencies are mutually equispaced within the available spectral amplification band, so as to use this band efficiently.

However, it is also possible for the frequencies to be wholly or partly nonequispaced, for example in order to reduce the effect of non-linear phenomena, such as four-wave interaction (FWM, Four Wave Mixing), in the optical fibers used for transmitting the signals. It is possible, furthermore, for the useful amplification band of the amplifiers to consist of two or more disjoint spectral bands, separated by spectral bands which are not suitable for transmitting or amplifying the signals, for example because of the particular spectral characteristics of the amplifiers or of the optical fibers used in the telecommunication system. In this case the wavelengths of the communication channels may, for example, be chosen in such a way that the corresponding frequencies are equispaced inside each individual spectral band. In a preferred example, with erbium-doped active fiber amplifiers, the wavelengths take values of between around 1535 nm and around 1561 nm and are equispaced. The spacing for 16 wavelengths is around 1.6 nm and for 32 wavelengths is around 0.8 nm.

The filters, according to the invention, are constructed and connected together in such a way as to eliminate, for each wavelength desired in reception, those adjacent.

In particular by eliminating the wavelengths strictly adjacent to the wavelength desired in reception, the latter is more greatly spaced (double spacing) with respect to the other wavelengths. For example the wavelengths $\lambda 3$ and $\lambda 6$ must be eliminated if it is desired to receive the wavelength $\lambda 5$.

The constructional tolerances for the optical components used, in particular for the filters, thereby become less severe.

In particular, if the wavelengths are eliminated first from one extremity of the transmission band, it is sufficient to eliminate, for each wavelength desired in reception, one adjacent wavelength only. For example if we start from the lower extremity of the band and if it is desired to receive the wavelength $\lambda 1$, then the wavelength $\lambda 2$ is eliminated. Continuing, the wavelength $\lambda 4$ is eliminated and the wavelength $\lambda 3$ is received, $\lambda 2$ already being eliminated. By repeating the process in this way the wavelengths with odd indices are received. On performing the same operation beginning from the upper extremity of the band, the wavelengths with even indices are received. For example if it is desired to receive the wavelength $\lambda 16$, then the wavelength $\lambda 15$ is eliminated and so on and so forth.

For the purposes of the present invention, the phrase wavelengths of even and odd indices is understood to means the wavelengths which are fed to the reception filters and for each of which it is desired to eliminate at least one adjacent or unwanted wavelength, respectively labeled as even or odd with respect to the relevant wavelength, defined as odd or even.

What is claimed is:

1. A method of optical telecommunication, comprising:
   generating a plurality of transmission signals having respective wavelengths and including a first subset and a second subset of signals having interleaved wavelengths;
   multiplexing said transmission signals forming a multi-wavelength optical signal;
   transmitting said multi-wavelength optical signal through an optical fiber;
   filtering the signals of the first subset from said multi-wavelength optical signal to allow reception thereof; and
   eliminating the signals of the second subset from said multi-wavelength optical signal, wherein the steps of eliminating and the steps of filtering are performed in series and in an alternating sequence.

2. The method according to claim 1, further including subdividing said multi-wavelength optical signal over at least a first and a second optical path after the step of transmitting, said alternating sequence of filtering and eliminating being performed on the signals of the first optical path, and on said second optical path, alternatingly filtering the signals of the second subset from said multi-wavelength optical signal to allow reception thereof and eliminating the signals of the first subset.

3. A system of optical telecommunication, comprising:
   a transmitting station comprising signal sources for generating transmission signals at respective preset wavelengths, and a multiplexer for combining said transmission signals in a single fiber optic line;
   a receiving station for receiving said transmission signals, comprising a selective separator for separating said transmission signals;
   a fiber optic line linking said transmitting and receiving stations; and
   wherein said selective separator comprises a plurality of transmissive filters having respective transmission wavelength bands and a plurality of blocking filters having respective blocking wavelength bands, said plurality of transmissive filters and said plurality of blocking filters being connected in series and in an alternated sequence, said transmission wavelength bands being different from said blocking wavelength bands.

4. The system of optical telecommunication according to claim 3, wherein said transmissive filters are interference filters and said blocking filters are Bragg grating filters.

5. The system of optical telecommunication according to claim 4, wherein said selective separator further includes a signal divider for subdividing said transmission signals over at least a first optical path and a second optical path, each of said first and second optical paths being linked to a plurality of interference filters and a plurality of Bragg grating filters operatively associated in succession in an alternated sequence.

6. The system of optical telecommunication according to claim 5, wherein said optical paths are defined by optical fibers.

7. The system of optical telecommunication according to claim 4, wherein said transmission signals include a first subset and a second subset of signals having interleaved wavelengths, each interference filter linked to the first optical path having a transmission wavelength band including the wavelength of a respective signal of the first subset, each Bragg grating filter linked to the first optical path having a reflection wavelength band including the wavelength of a respective signal of the second subset, each interference filter linked to the second optical path having a transmission wavelength band including the wavelength of a respective signal of the second subset, and each Bragg grating filter linked to the second optical path having a reflection wavelength band including the wavelength of a respective signal of the first subset.

8. The system of optical telecommunication according to claim 4, wherein each of said Bragg grating filters has a −0.5 dB reflected band of greater than or equal to 0.3 nm.

9. The system of optical telecommunication according to claim 4, wherein each of said Bragg grating filters has a −20 dB reflected band of less than or equal to 1.2 nm.

10. The system of optical telecommunication according to claim 4, wherein each of said interference filters has a −0.5 dB passband of greater than or equal to 0.5 nm.

11. The system of optical telecommunication according to claim 4, wherein each of said interference filters has a −25 dB passband of less than or equal to 2.4 nm.

12. The system of optical telecommunication according to claim 4, wherein said interference filters and said Bragg grating filters are selected in such a way as to obtain in combination an isolation of at least 35 dB between two preset wavelengths at a distance of up to 1.6 nm apart.

13. The system of optical telecommunication according to claim 4, wherein said interference filters and said Bragg grating filters are selected in such a way as to obtain in combination an isolation of at least 25 dB between two present wavelengths at a distance of up to 0.8 mn apart.

14. A wavelength-selective optical receiving unit, comprising a selective separator for separating wavelength division multiplexed transmission signals, wherein said selective separator includes a plurality of transmissive filters having respective transmission wavelength bands and a plurality of blocking filters having respective blocking wavelength bands, said plurality of transmissive filters and said plurality of blocking filters being connected in series and in an alternated sequence, said transmission wavelength bands being different from said blocking wavelength bands.

15. The wavelength-selective optical receiving unit according to claim 14, wherein said transmissive filters are interference filters and said blocking filters are Bragg grating filters.

16. The wavelength-selective optical receiving unit according to claim 14, wherein said selective separator further includes a signal divider for subdividing said transmission signals over at least two optical paths, each of said optical paths being linked to a plurality of interference filters and a plurality of Bragg grating filters operatively associated in succession in an alternate sequence.

17. A system of optical telecommunication, comprising:
 a transmitting station comprising a plurality of signal sources for generating transmission signals at respective wavelengths, and a multiplexer for combining said transmission signals in a single fiber optic line;
 a station for receiving said transmission signals, comprising a selective separator for separating said transmission signals;
 a fiber optic line linking said transmission and receiving stations;
 wherein said selective separator comprises:
  a signal divider for subdividing said transmission signals over two optical paths;
  a first optical circulator and a second optical circulator, each having a first, a second, and a third port; the first port of each optical circulator being linked to a respective one of said optical paths for receiving said transmission signals;
  a first plurality of blocking filters optically coupled to the second port of the first optical circulator and adapted to receive said transmission signals and to reflect a first subset of transmission signals; a second plurality of blocking filters optically coupled to the second port of the second optical circulator and adapted to receive said transmission signals and to reflect a second subset of transmission signals; and
  a first plurality of transmissive filters optically coupled to the third port of the first optical circulator and adapted to receive the first subset of transmission signals and to transmit the first subset of transmission signals to a first plurality of receivers; a second plurality of transmissive filters optically coupled to the third port of the second optical circulator and adapted to receive the second subset of transmission signals and to transmit the second subset of transmission signals to a second plurality of receivers.

18. The system of optical telecommunication according to claim 17, wherein said blocking filters include Bragg grating filters.

19. The system of optical telecommunication according to claim 17, wherein said transmissive filters include interference filters.

20. The system of optical telecommunication according to claim 17, wherein the blocking filters of said first plurality of blocking filters or the blocking filters of said second plurality of blocking filters are connected in series.

21. The system of optical telecommunication according to claim 17, wherein the transmissive filters of said first plurality of transmissive filters or the transmissive filters of said second plurality of transmissive filters are connected in series.

22. The system of optical telecommunication according to claim 17, wherein the wavelengths of the first subset of transmission signals are interleaved with the wavelengths of the second subset of transmission signals.

23. A wavelength-selective optical receiving unit, comprising a selective separator for separating wavelength division multiplexed transmission signals, wherein said selective separator comprises:
 a signal divider for subdividing said transmission signals over two optical paths;
 a first optical circulator and a second optical circulator, each having a first, a second, and a third port; the first port of each optical circulator being linked to a respective one of said optical paths for receiving said transmission signals;
 a first plurality of blocking filters optically coupled to the second port of the first optical circulator and adapted to receive said transmission signals and to reflect a first subset of transmission signals; a second plurality of blocking filters optically coupled to the second port of the second optical circulator and adapted to receive said transmission signals and to reflect a second subset of transmission signals; and
 a first plurality of transmissive filters optically coupled to the third port of the first optical circulator and adapted to receive the first subset of transmission signals and to transmit the first subset of transmission signals to a first plurality of receivers; a second plurality of transmissive filters optically coupled to the third port of the second optical circulator and adapted to receive the second subset of transmission signals and to transmit the second subset of transmission signals to a second plurality of receivers.

* * * * *